Oct. 30, 1951
R. P. McNERNEY
2,573,479
DECELERATION SIGNAL
Filed Dec. 1, 1949
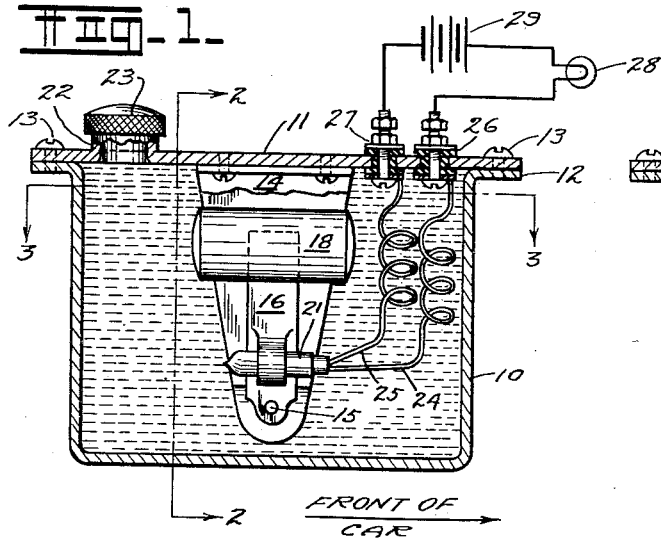
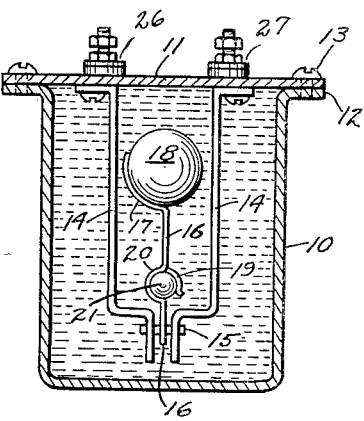
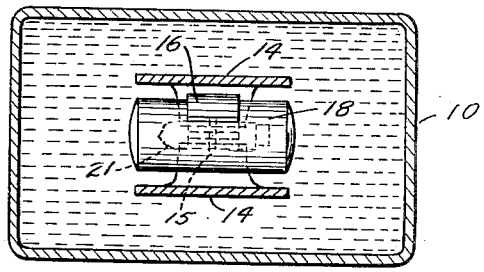
INVENTOR.
Robert P. McNerney.
BY
ATTORNEY.

Patented Oct. 30, 1951

2,573,479

UNITED STATES PATENT OFFICE 2,573,479

DECELERATION SIGNAL

Robert P. McNerney, Sharpsville, Pa., assignor of fifty per cent to Charles J. Songer, Farrell, Pa.

Application December 1, 1949, Serial No. 130,497

3 Claims. (Cl. 200—52)

This invention relates to signals and more particularly to a deceleration signal for use in connection with motor vehicles.

The principal object of the invention is the provision of a deceleration indicator for motor vehicles.

A further object of the invention is the provision of a deceleration signal incorporating a self-leveling mechanism operating by inertia to close an electrical circuit upon the deceleration of a vehicle in which the device is positioned.

A still further object of the invention is the provision of a deceleration signal incorporating means movable by deceleration of the motor vehicle to close an electrical circuit.

The deceleration signal shown and described herein comprises an improvement in the art of such signals in that a simple trouble-free mechanism is disclosed which may be attached to a motor vehicle in various locations and which will be operative when connected with a power source and a signal light on the vehicle in indicating instantaneously any deceleration in the vehicle. The deceleration signal disclosed herein is capable of maintaining its normal inoperative position despite any inclination of the motor vehicle to which it is attached.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation with parts broken away in cross section.

Figure 2 is a vertical section taken on line 2—2 of Figure 1.

Figure 3 is a horizontal section taken on line 3—3 of Figure 1.

By referring to the drawings and Figure 1 in particular it will be seen that the deceleration signal comprises a liquid-tight housing 10 having a closure 11 secured thereto in a liquid-tight manner and specifically against an outturned flange 12 on the housing 10 by reason of a plurality of fasteners 13. Secured to the closure 11 and depending therefrom there are a pair of oppositely disposed brackets 14—14 which are engaged adjacent their lowermost ends by a pivot pin 15 and spaced with respect to one another thereby. An arm 16 is engaged upon the pivot pin 15 and has the uppermost end 17 thereof formed in a radius and secured to a float 18. Midway between the upper and lowermost ends of the arm 16 there is a struck-out tongue 19 and a matching oppositely disposed radius 20 formed in the arm to provide a cage for a mercury switch 21.

The housing 10 is completely filled with liquid such as a light oil which is positioned in the housing 10 through a filler pipe 22 which is provided with a cap 23. The filler pipe 22 extends upwardly from the closure 11 and with the cap 23 forms an air space above the level of the fluid in the housing 10 so that the liquid level is always maintained at a point above the highest portion of the housing 10. Thus, the float 18 holds the arm 16 in vertical position and the mercury switch 21 in horizontal position. The mercury switch 21 is so arranged that it is in operative or open position when horizontally disposed and so that it must be inclined sidewardly and downwardly toward the right as seen in Figure 1 in order to close a circuit therethrough. Circuit wires 24 and 25 lead from the mercury switch 21 to terminals 26 and 27 which extend through the closure 11 and are insulated with respect thereto. The circuit wires 24 and 25 are flexible conductors so as not to interfere with the tilting movement of the switch as imparted thereto by the float 18 as will be subsequently explained in connection with the operation of the device. As illustrated in Figure 1, the terminals 26 and 27 are connected with an incandescent bulb 28 and a power source 29 so that the mercury switch 21 will, upon being closed as by being tilted, close the circuit through the incandescent bulb 28 and thereby illuminate the same.

By referring to Figures 2 and 3 of the drawings it will be seen that the arms 16, the float 18 and the switch 21 are positioned exactly midway between the depending brackets 14—14 and are, therefore, free to move on the pivot pin 15 responsive to inertia imparted to the float at such time as the device is secured to a motor vehicle and acts responsive to the acceleration or deceleration thereof.

In operation the device is preferably attached to the motor vehicle in the vicinity of one of the circuit wires normally used in connection with the stop light of the vehicle with the stop light switch and power source as known in the art. The device then acts as a secondary switch or circuit closer in the stop light circuit and is thereby capable of lighting the stop light of the vehicle well in advance of any action resulting from the application of the brakes of the vehicle and the subsequent closing of the usual stop light switch. For example, if the equipped motor vehicle is being driven along at a uniform rate of speed, the fluid will maintain the arm 16 in normal vertical position and the switch 21 in horizontal position and thereby open. This action is maintained despite any inclination of the motor vehicle as in going up or down a hill as the float 18, the arms 16 and the switch 21 all pivot freely on the pivot pin 15. However, at such time as the motor vehicle begins to decelerate, inertia of the float 18 causes the same to move to the right, as shown in Figure 1 of the drawings, which is the direction of the front of the vehicle and thereby tilts the arms 16 and the mercury switch 21 to move it to closed circuit position. The inertia of the mercury in the switch 21 is also utilized at the same time to move toward the right end of the switch 21 at such time as the vehicle decelerates. Thus an instantaneous deceleration warning is given as the closed circuit energizes the stop light of the vehicle.

At such time as the deceleration of the vehicle ends, the float 18 again seeks its normal level, moves the arms 16 vertically and the switch 21 to horizontal position and thereby opens the circuit. Acceleration of the vehicle tends only to move the float 18 to the left and thereby tilts the mercury switch away from open position so that inertia of the mercury therein is unable to cause the same to flow sufficiently to reach the contacts and close the circuit therethrough. It will be observed that there is at no time any flow of the fluid in the housing 10 and in which the entire mechanism of the device is submerged. There is, therefore, no false action of the deceleration signal such as would occur if the device were responsive in operation or adjustment to the fluid level in the housing. It will also be seen that the device may be inexpensively constructed and that all of the working parts are assembled through the closure 11 and then positioned in the housing 10 by the positioning and securing of the closure 11 thereto.

It will thus be seen that the several objects of the invention have been met by the deceleration signal herein disclosed.

Having thus described my invention, what I claim is:

1. A deceleration signal comprising a liquid filled housing having a removable closure forming its top portion, brackets depending from said closure into said liquid filled housing and a pivot pin spacing the said brackets at their lowermost ends, an arm pivoted to said pivot pin between the said brackets and a float secured to the upper end of the said arm so as to maintain the same in normal vertical position, a tubular mercury switch element positioned horizontally on the said arm above the said pivot pin, the said switch being responsive in closing to movement of the arm and float resulting from inertia overcoming the normal floating position thereof.

2. A deceleration signal actuating device comprising a liquid filled housing, a pivot pin positioned in the lower central portion of the said housing, an arm pivoted to said pivot pin and a float secured to the upper end of said arm so as to maintain the same in normal vertical position, a tubular mercury switch element positioned horizontally on the said arm above the said pivot pin, the said switch being responsive in closing to movement of the arm and float resulting from inertia overcoming the normal floating position thereof.

3. A deceleration signal actuating device comprising a liquid filled housing, brackets on one wall of said housing extending into the lower central area thereof, a pivot pin spacing the brackets at their lowermost ends, an arm pivoted to said pivot pin between the said brackets and a float secured to the upper end of the said arm so as to maintain the same in vertical position, a tubular mercury switch element positioned horizontally on the said arm below the said float, the said switch being responsive in closing to movement of the arm and float resulting from inertia overcoming the normal floating position thereof.

ROBERT P. McNERNEY.

REFERENCES CITED

The following references are of record in the file of this patent:

UNITED STATES PATENTS

| Number | Name | Date |
| --- | --- | --- |
| 1,962,125 | Burkle | June 12, 1934 |
| 2,065,594 | Lyman | Dec. 29, 1936 |
| 2,307,441 | Wyman | Jan. 5, 1943 |
| 2,470,553 | Gudmundsson | May 17, 1949 |